(12) United States Patent
Shinkawa et al.

(10) Patent No.: US 10,259,491 B2
(45) Date of Patent: Apr. 16, 2019

(54) MOTOR CONTROL APPARATUS AND ELECTRIC POWER STEERING APPARATUS PROVIDED THE SAME

(71) Applicant: NSK Ltd., Tokyo (JP)

(72) Inventors: Naoto Shinkawa, Tokyo (JP); Shigeru Fukinuki, Tokyo (JP); Shin Kumagai, Tokyo (JP); Shigeru Shimakawa, Tokyo (JP); Teruyoshi Kogure, Tokyo (JP)

(73) Assignee: NSK LTD., Tokyo (JP)

( * ) Notice: Subject to any disclaimer, the term of this patent is extended or adjusted under 35 U.S.C. 154(b) by 293 days.

(21) Appl. No.: 15/317,572

(22) PCT Filed: May 8, 2015

(86) PCT No.: PCT/JP2015/063329
§ 371 (c)(1),
(2) Date: Dec. 9, 2016

(87) PCT Pub. No.: WO2015/190192
PCT Pub. Date: Dec. 17, 2015

(65) Prior Publication Data
US 2018/0154931 A1 Jun. 7, 2018

(30) Foreign Application Priority Data

Jun. 13, 2014 (JP) .................................. 2014-122283
Mar. 4, 2015 (JP) .................................. 2015-042718

(51) Int. Cl.
*H02P 29/68* (2016.01)
*B62D 5/04* (2006.01)
*H02P 27/08* (2006.01)

(52) U.S. Cl.
CPC ........... *B62D 5/0484* (2013.01); *B62D 5/046* (2013.01); *B62D 5/0481* (2013.01);
(Continued)

(58) Field of Classification Search
CPC .... B62D 5/0487; B62D 5/046; B62D 5/0484; H02P 29/032; H02P 25/22
See application file for complete search history.

(56) References Cited

U.S. PATENT DOCUMENTS 7,652,858 B2 * 1/2010 Tang .................... H02H 7/0838
361/18
9,571,014 B2 * 2/2017 Mahdavi ................... H02J 1/10
(Continued)

FOREIGN PATENT DOCUMENTS

DE 102011055626 A1 8/2013
EP 2112051 A1 10/2009
(Continued)

OTHER PUBLICATIONS

International Search Report of PCT/JP2015/063329 dated Jun. 16, 2015.
(Continued)

*Primary Examiner* — Bickey Dhakal
*Assistant Examiner* — Zoheb Imtiaz
(74) *Attorney, Agent, or Firm* — Sughrue Mion, PLLC

(57) ABSTRACT

An electric power steering apparatus that drive-controls a motor by an inverter, and a motor release-switch is connected between the inverter and the motor, comprising: a control section to detect an assist state on a driving control system and to ON/OFF-switch a control of the inverter based on a detection result; a motor rotational number detecting section to detect a rotational number of the motor; an energy calculating section to calculate an energy of a motor back-EMF and a regenerative current based on the rotational number; and a judging section to compare the energy with an area of safety operation of the motor release-switch and to OFF-switch the d motor release-switch when the energy becomes within the area of safety operation. As
(Continued)

occasion demands, the area of safety operation is calculated with the temperature.

6 Claims, 11 Drawing Sheets

(52) U.S. Cl.
CPC ............ *B62D 5/0496* (2013.01); *H02P 29/68* (2016.02); *H02P 27/08* (2013.01)

(56) References Cited

U.S. PATENT DOCUMENTS

| | | | |
|---|---|---|---|
| 2005/0093505 A1* | 5/2005 | Kameya | B62D 5/046 |
| | | | 318/805 |
| 2005/0241875 A1* | 11/2005 | Ta | B62D 5/046 |
| | | | 180/443 |
| 2006/0113952 A1* | 6/2006 | Zhou | H02P 6/181 |
| | | | 318/801 |
| 2008/0067960 A1* | 3/2008 | Maeda | B62D 5/046 |
| | | | 318/400.02 |
| 2010/0270958 A1 | 10/2010 | Tsuboi et al. | |
| 2011/0273122 A1 | 11/2011 | Murata et al. | |
| 2014/0054103 A1* | 2/2014 | Kezobo | B62D 5/0487 |
| | | | 180/446 |
| 2016/0028336 A1* | 1/2016 | Oyama | H02P 27/06 |
| | | | 318/564 |
| 2017/0264221 A1* | 9/2017 | Cash | H02H 7/0838 |

FOREIGN PATENT DOCUMENTS

| | | |
|---|---|---|
| JP | 2000-37089 A | 2/2000 |
| JP | 2005-199746 A | 7/2005 |
| JP | 2008-092727 A | 4/2008 |
| JP | 2008-141868 A | 6/2008 |
| JP | 2009-220705 A | 10/2009 |
| JP | 2011-239489 A | 11/2011 |
| JP | 5120041 B2 | 1/2013 |
| JP | 2013-183462 A | 9/2013 |

OTHER PUBLICATIONS

Communication dated Jul. 24, 2017, from the European Patent Office in counterpart European Application No. 15806040.0.

* cited by examiner

PRIOR ART

PRIOR ART

MOTOR CONTROL APPARATUS AND ELECTRIC POWER STEERING APPARATUS PROVIDED THE SAME

CROSS REFERENCE TO RELATED APPLICATIONS

This application is a National Stage of International Application No. PCT/JP2015/063329 filed May 8, 2015, claiming priority based on Japanese Patent Application No. 2014-122283 filed Jun. 13, 2014 and Japanese Patent Application No. 2015-042718 filed Mar. 4, 2015, the contents of all of which are incorporated herein by reference in their entirety.

TECHNICAL FIELD

The present invention relates to a motor control apparatus that protects a motor release-switch comprising semiconductor switching elements (e.g. FETs) and being connected to a power supplying section (an inverter) from a regenerative power (obtained with a back-EMF and a regenerative current) energy (power) (and a temperature) caused by a motor rotation when a motor is rotated by an external force, and to an electric power steering apparatus provided the above motor control apparatus.

The electric power steering apparatus applies an assist force to a steering system of a vehicle by means of the motor due to a current command value calculated based on at least a steering torque and is drive-controlled by the inverter comprising a bridge circuit of the semiconductor switching elements.

BACKGROUND ART

There is an electric power steering apparatus (EPS) as an apparatus provided a motor control apparatus, and the electric power steering apparatus assist-controls a steering mechanism of a vehicle by using a rotational force (assist force) of a motor. That is, a driving force of the motor controlled by a power supplied from a power supplying section (inverter) is applied to a steering shaft or a rack shaft by means of a transmission mechanism such as gears. In order to accurately generate the steering assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a pulse width modulation (PWM) control.

A general configuration of a conventional electric power steering apparatus will be described with reference to FIG. 1. As shown in FIG. 1, a column shaft (a steering shaft, a handle shaft) 2 connected to a handle 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque Th of the handle 1 and a steering angle sensor 14 to detect a steering angle θ, and a motor 20 for assisting the steering force of the handle 1 is connected to the column shaft 2 through the reduction gears 3. Electric power is supplied to a control unit (an ECU) 100 for controlling the electric power steering apparatus from a battery 13, and an ignition key signal is inputted into the control unit 100 through an ignition key 11. The control unit 100 calculates a current command value of an assist (steering assist) command based on the steering torque Th detected by the torque sensor 10 and a vehicle speed Vel detected by a vehicle speed sensor 12, and controls a current supplied to the motor 20 for EPS based on a voltage control command value Vref obtained by performing compensation and so on with respect to the current command value in a current control section.

The steering angle sensor 14 is not always necessary and it is possible to remove. Further, it is possible to get the steering angle from a rotational sensor such as a resolver connected to the motor 20.

A controller area network (CAN) 50 to send/receive various information and signals on the vehicle is connected to the control unit 100, and it is also possible to receive the vehicle speed Vel from the CAN 50. Further, a Non-CAN 51 is also possible to connect to the control unit 30, and the Non-CAN 51 sends and receives a communication, analogue/digital signals, electric wave or the like except for the CAN 50.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque Th detected by the torque sensor 10 and the vehicle speed Vel detected (or from the CAN 50) by the vehicle speed sensor 12 are inputted into a current command value calculating section 101. The current command value calculating section 101 decides a current command value Iref1 that is a desired value of the current supplied to the motor 20 based on the steering torque Th and the vehicle speed Vel and by means of an assist map and so on. The current command value Iref1 is inputted into a current limiting section 103 through an adding section 102A. A current command value Irefm that is limited the maximum current, is inputted into a subtracting section 102B for the feedback, and a deviation I (=Irefm−Im) between the current command value Irefm and a motor current value Im that is fed back, is calculated. The deviation I is inputted into a PI-control section 104 to improve a characteristic of the steering operation. The voltage command value Vref that characteristic improvement is performed in the PI-control section 104, is inputted into a PWM-control section 105. Furthermore, the motor 20 is PWM-driven through an inverter 106 serving as a drive section. The current value Im of the motor 20 is detected by a current detector 107 and is fed back to the subtracting section 102B. The inverter 106 uses EFTs (field-effect transistors) as switching elements and is comprised of a bridge circuit of FETs.

A rotational sensor 21 such as a resolver is connected to the motor 20, a motor rotational angle θ is outputted from the rotational sensor 21, and further a motor velocity ω is calculated in a motor velocity calculating section 22

Further, a compensation signal CM from a compensating section 110 is added in the adding section 102A, and the compensation of the system is performed by the addition of the compensation signal CM so as to improve a convergence, an inertia characteristic and so on. The compensating section 110 adds a self-aligning torque (SAT) 113 and an inertia 112 in an adding section 114, further adds the result of addition performed in the adding section 114 and a convergence 111 in an adding section 115, and then outputs the result of addition performed in the adding section 115 as the compensation signal CM.

In the case that the motor 20 is a 3-phase (U-phase, V-phase and W-phase) brushless motor, details of the PWM-control section 105 and the inverter 106 are a configuration such as shown in FIG. 3. The PWM-control section 105 comprises a duty calculating section 105A that calculates PWM-duty command values D1~D6 of three phases according to a given expression based on the voltage control command value Vref and a gate driving section 105B that drives gates of FETs as serving drive elements with the PWM-duty command values D1~D6 and ON/OFF-switches after the compensation of the dead time. Further, the inverter 106 comprises a three-phase bridge (FET1~FET6) of FETs as serving semiconductor switching elements and drives the motor 20 by being ON/OFF-switched based on the PWM duty command values D1~D6. A motor relay 23 to supply (ON) a power and block (OFF) is provided at power supplying lines between the inverter 106 and the motor 20.

In such the above electric power steering apparatus, there are cases to encounter an unexpected situation of a system abnormality detection time (for example, a disconnection of the torque sensor, a short-circuit accident of the motor control stage-FETs and so on). AS a counterplan for these cases, first, an assist control of the electric power steering apparatus is instantly stopped and a connection a drive control system and the motor is cut-offed.

Generally, as shown in FIG. 3, the motor relay 23 for supplying/blocking the motor current is provided between the motor 20 and the inverter 106 to control the current flowing in the motor 20. A cheap contact relay is used for the motor relay 23, and the current flowing the motor 20 is cut-offed in a hard-wear by electromagnetically releasing the contact (e.g. Japanese Published Unexamined Patent Application No. 2005-199746 A (Patent Document 1)).

However, recently, a motor release-switch comprising non-contact semiconductor switching elements (analogue switches), for example FETs, has been used in place of the contact electromagnetic motor relay for the improvement of a miniaturization and a reliability as well as a cost reduction. But, when the assist continuation becomes impossible due to the system abnormality, the motor is rotated even if the inverter is stopped. At this time, if the motor release-switch is OFF-switched during the motor rotation, a regenerative current of the motor deviates an area of safety operation of the motor release-switch and there is a case that the motor release-switch is broken or destroyed.

THE LIST OF PRIOR ART DOCUMENTS

Patent Documents

Patent Document 1: Japanese Published Unexamined Patent Application No. 2005-199746 A
Patent Document 2: Japanese Published Unexamined Patent Application No. 2013-183462 A
Patent Document 3: Japanese Patent No. 5120041 B2

SUMMARY OF THE INVENTION

Problems to be Solved by the Invention

As an apparatus used semiconductor switching elements for the motor relay, for example, Japanese Published Unexamined Patent Application No. 2013-183462 A (Patent Document 2) proposes the following apparatus. That is, when a failure of the power conversion equipment (inverter) is detected, the apparatus disclosed in Patent Document 2 stops the driving of the inverter, OFF-switches a first power relay, and then ON-switches a second power relay. Then, at a state that the driving of the inverter is stopped, when the motor is rotated due to the external force and the regenerative voltage is generated, the regenerative voltage is regenerated to a power source (battery) from the inverter through the second power relay of ON-state and a parasitic diode of the first power relay.

In the electric power steering apparatus, it is necessary to especially attend to the occurrence of the back-EMF due to the motor rotation and the element destruction due to the deviation of the area of safety operation of the semiconductor element based on a switching loss caused by the regenerative current when the motor relay is OFF-switched. In this connection, it is strongly desired to securely and cheaply perform the counterplan for the element destruction without addition of the hardware parts.

Further, the apparatus disclosed. in Japanese Patent No. 5120041 B2 (Patent Document 3) judges, in a case that all phase-release means (motor relays) are operatively opened and the voltage is applied to a specific one phase, that the short-circuit failure occurred at a phase-release means provided at the specific phase when the terminal voltage due to voltage applying is detected at another phase except for the specific phase. Therefore, the apparatus disclosed in Patent Document 3 detects the failure of the phase-release means-self and does not positively manager the device protection of the semiconductor switching element.

The present invention has been developed in view of the above-described circumstances, and an object of the present invention is to provide a motor control apparatus that, with a high reliability, protects the motor release-switch comprising the semiconductor switching elements in small size without addition of the device parts as well as the relation with a temperature and an electric power steering apparatus provided the same.

Means for Solving the Problems

The present invention relates to a motor control apparatus that drive-controls a motor by an inverter based on a current command value, and a motor release-switch comprising semiconductor switching elements is connected between the inverter and the motor, the above-described object of the present invention is achieved by that comprising: a control section to detect an assist state on a driving control system and to ON/OFF-switch a control of the inverter based on a detection result; a motor rotational number detecting section to detect a rotational number of the motor; an energy calculating section to calculate an energy of a motor back-EMF and a regenerative current based on the rotational number; and a judging section to compare the energy with an area of safety operation of the motor release-switch and to OFF-switch the motor release-switch when the energy becomes within the area of safety operation.

Further, the above-described object of the present invention is more effectively achieved by that wherein the control of the inverter is ON-switched when the control section does not detect an abnormality, and the control of the inverter is OFF-switched when the control section detects the abnormality; or wherein the motor release-switch comprises field-effect transistors (FETs); or wherein the driving control system is a torque sensor and the inverter, or the motor control apparatus further comprising a temperature detecting section to detect a temperature of the semiconductor switching elements or a circumference temperature of the semiconductor switching elements, wherein the control section further includes an area of safety operation calculating section to calculate the safety operating region based on a detected temperature detected by the temperature detecting section; or the motor control apparatus further comprising an abnormality detecting section and a state detecting section to detect a presence of an abnormality based on an information from the abnormality detecting section, wherein the control section ON-switches the control of said inverter when the state detecting section does not detect the abnormality and OFF-switches said control of the inverter when the state detecting section detects the abnormality; or wherein the temperature detecting section comprises a temperature sensor; or wherein an object of the abnormality detecting section is sensor kinds and the inverter.

Effects of the Invention

A motor control apparatus according to the present invention, in a case that a motor rotational number is high (an energy (a regenerative power) of a motor back-EMF and a regenerative current is equal to or more than an area of safety operation), performs a control to return the regenerative current to a power source by continuing a motor release-switch-ON and gives a breaking force to a motor during rotation, and OFF-switches the motor release-switch after a time when the motor rotational number gradually decrease due to the breaking force and then it enters into an area of safety operation (the energy (the regenerative power) of the motor back-EMF and the regenerative current is less than the area of safety operation). Thus, it is possible to securely protect the motor release-switch comprising the semiconductor switching elements with a cheap constitution without addition of new device parts and also without addition of a new protecting circuit.

Further, in a case that a temperature of the motor release-switch or a circumference temperature thereof is referred for the calculation of the area of safety operation of the semiconductor switching elements, it is possible to realize a protection of the ON/OFF-control coinciding with a temperature characteristic of the motor release-switch being a protecting object.

According to an electric power steering apparatus provided the motor control apparatus of the present invention, it is securely and easily possible to protect the semiconductor switching elements of the motor release-switch provided between the motor and the inverter and to further enhance the improvement of the steering safety and the reliability.

MODE FOR CARRYING OUT THE INVENTION

According to the present invention, a motor release-switch (a motor relay) comprises semiconductor switching elements (e.g. FETs) for the miniaturization, the improvement of the reliability and the cost reduction of the motor release-switch. In order to protect a device destruction of the motor release-switch due to a motor regenerative power (calculated from a motor back-EMF and a regenerative current) occurring at a rotational time of the motor by an external force when an assist continuing-impossibility is caused with an abnormality occurrence of a sensor, an inverter and so on (including a case that an ignition key is OFF-switched during a motor rotation), the present invention calculates an energy of the motor back-EMF and the regenerative current based on a data table or the like from a motor rotational number and then calculates an area of safety operation (AOS) of the motor release-switch based on a temperature of the motor release-switch or a circumference temperature. Then, when the motor rotational number is high (the energy of the motor back-EMF and the regenerative current is equal to or more than the area of safety operation), an ON-state of the motor release-switch is continued and a control to return the regenerative current to a power source is performed. Due to the return control of the regenerative current to the power source, a braking force is given to the motor during the rotation and then the motor rotational number gradually decreases with the braking force. After the motor rotational number enters into the area of safety operation (the energy of the motor back-EMF and the regenerative current is less than the area of safety operation), the motor release-switch is OFF-switched and then necessary processing for the assist control-stop is carried out.

As stated above, since the present invention monitors the motor rotation (and the temperature information) and OFF-switches the semiconductor switching elements of the motor release-switch. when the motor rotational number becomes a rotational number that the switching loss of the FET-OFF time due to regenerative power calculated the motor back-EMF and the regenerative current enters in the area of safety operation, there is not occurred a damage or a destruction of the semiconductor switching elements by deviation of the area of safety operation due to the switching loss of a semiconductor switching element-OFF time, and it is possible to securely protect the semiconductor switching elements and to provide a high reliability motor control apparatus and an electric power steering apparatus.

Furthermore, the motor becomes a free-run at an emergency assist OFF-time. Factors of the assist-OFF are an abnormality of the inverter, an OFF of the ignition key, an abnormal detection of the hardware and the software, an abnormality of the sensor kinds and so on.

Hereinafter, embodiments of the present invention will be described in detail with reference to the accompanying drawings.

Figure 1:
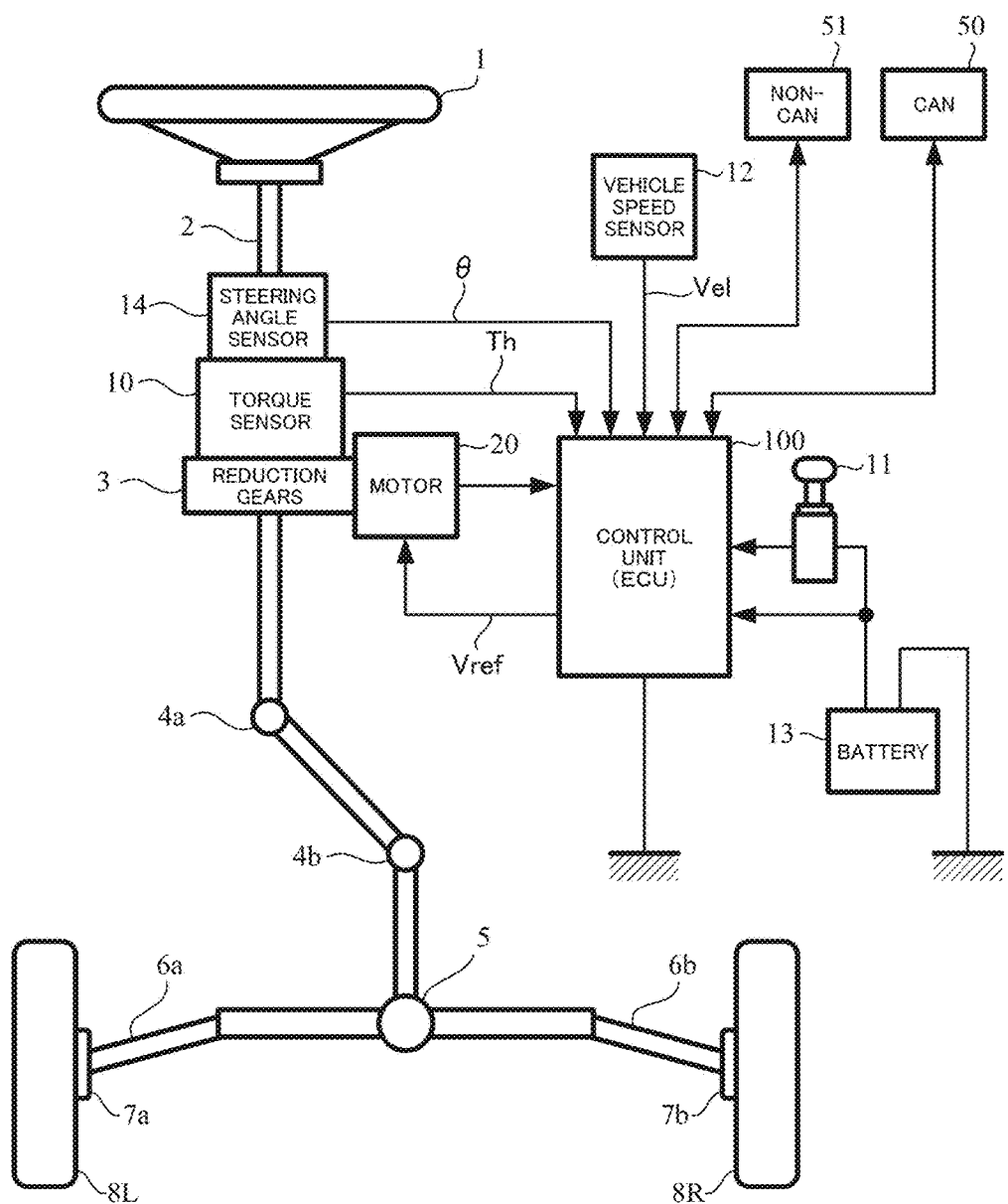
FIG. 1 is a diagram showing a configuration example of a general electric power steering apparatus.
Figure 2:
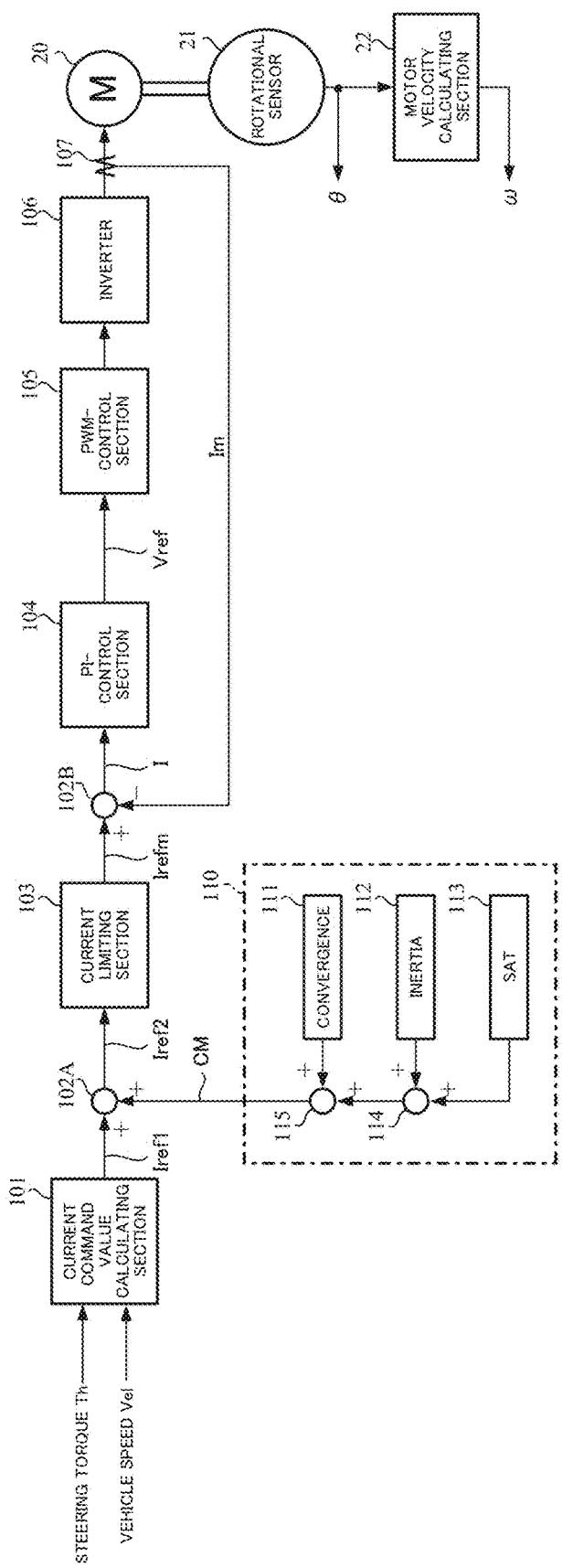
FIG. 2 is a block diagram showing one example of a control unit (ECU) of the electric power steering apparatus.
Figure 3:
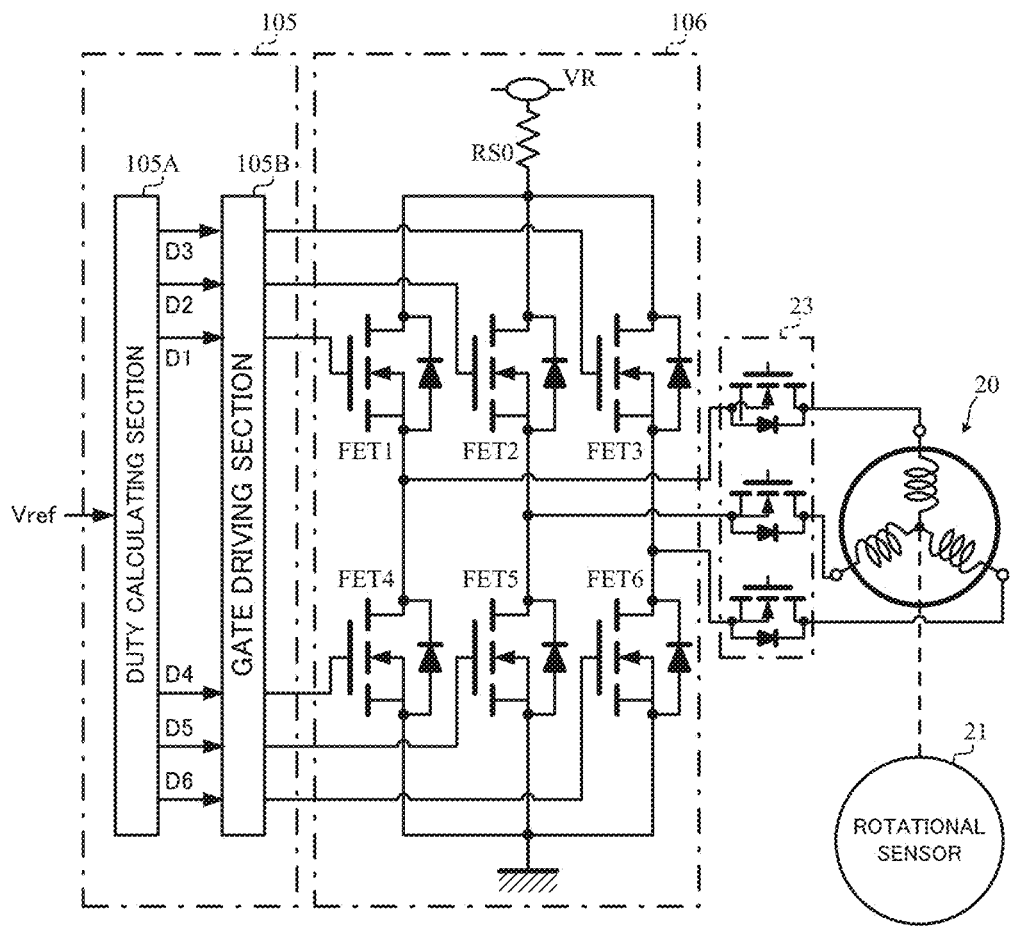
FIG. 3 is a wiring diagram showing a configuration example of a motor control section of the electric power steering apparatus.
Figure 4:
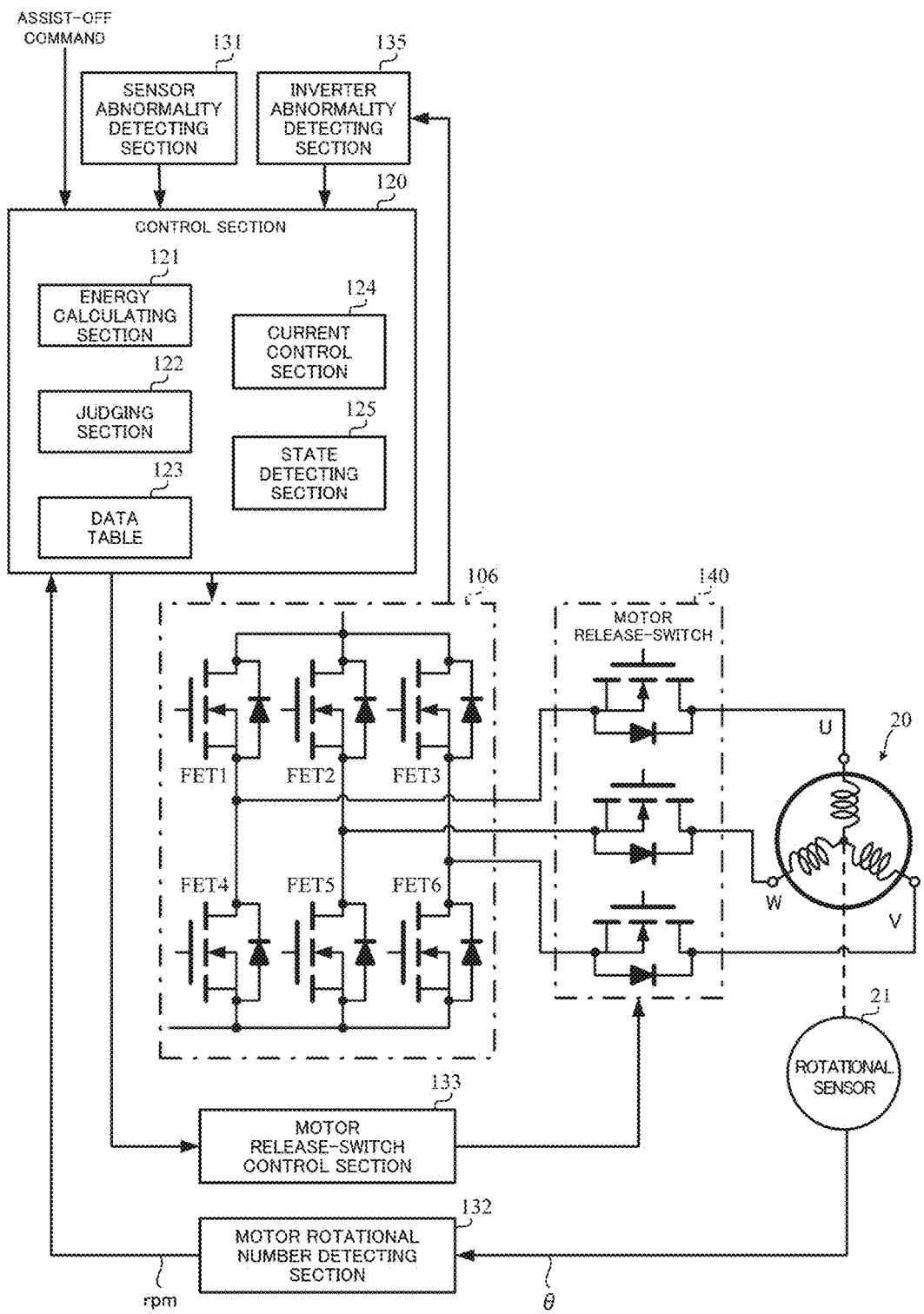
FIG. 4 is a block diagram showing a configuration example (the first embodiment) of the present invention.
Figure 5:
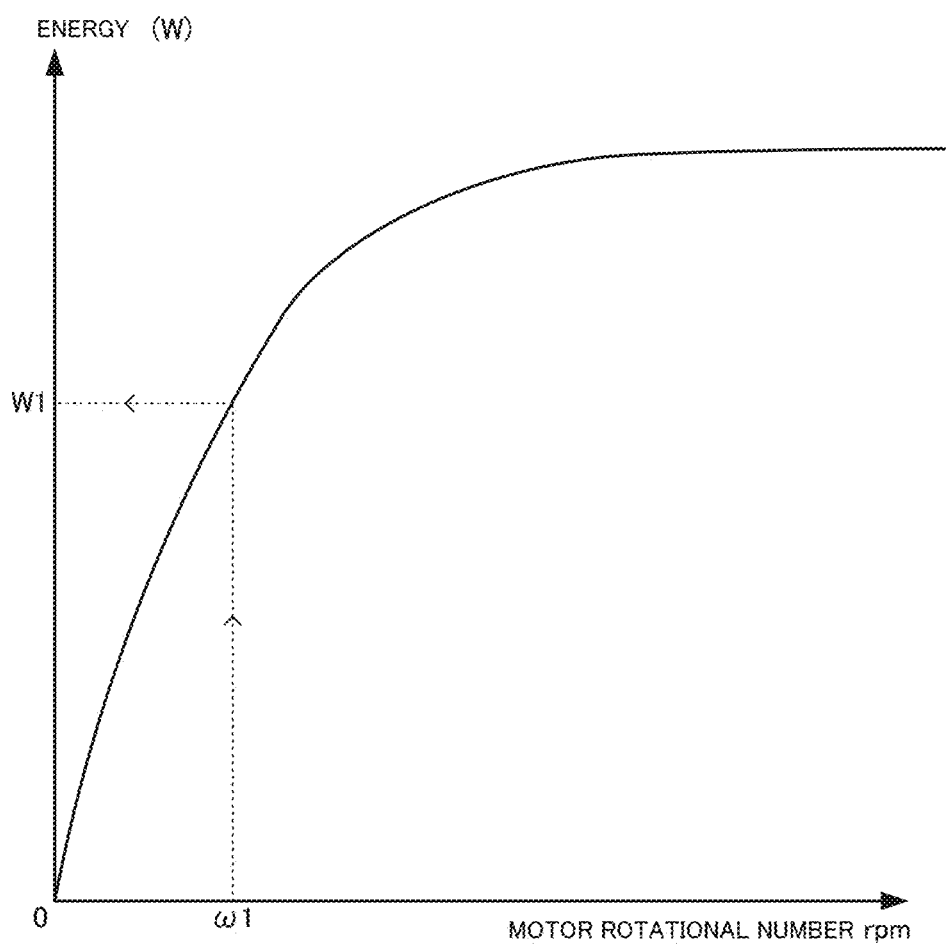
FIG. 5 is a characteristic diagram to show a characteristic example of a data table.

A configuration example of the present invention is shown in FIG. 4 corresponding to FIG. 2. As shown in FIG. 4, a control section 120 according to the present invention comprises an energy calculating section 121, a judging section 122, a data table 123, a current control section 124 and a state detecting 125. The data table 123 in advance obtains an energy W corresponding to the motor rotational number rpm, i.e., the energy W of the motor back-EMF and the regenerative current corresponding to the motor rotational number rpm, and is tabulated and has a characteristic as shown in FIG. 5. Therefore, it is possible to calculate the energy W of the motor back-EMF and the regenerative current by detecting the motor rotational number rpm. In FIG. 5, for example, the calculation is performed as the energy W is "W1" when the motor rotational number rpm is "ω1".

In addition, as the data table 123, the data may be stored in a memory such as an EEPROM.

Further, there are provided a sensor abnormality detecting section 131 to detect an abnormality (including a failure) of the sensor kinds such as the torque sensor, an inverter abnormality detecting section 135 to detect an abnormality (including a failure) of the inverter 106, and a state detecting section 125 to detect a state of the abnormality or the like based on the sensor abnormality detecting section 131, the inverter abnormality detecting section 135 and so on and to perform necessary processing. The state detecting section 125 inputs an assist-OFF command and detects all of the assist-OFF operation as an object. For example, the state detecting section 125 detects a state such that the ignition key is OFF-switched during the motor rotation.

Furthermore, the motor release-switch 140 (140U, 140V, 140W) comprising FETs as the semiconductor switching elements is connected to power supplying lines (U-phase, V-phase, W-phase) between the inverter 106 controlled by the current control section 124 in the control section 120 and the motor 20, and the motor release-switch 140 is ON/OFF-switched by a motor release-switch control section 133 controlled by the control section 120. There is provided a motor rotational number detecting section 132 detect the motor rotational number rpm based on a rotational angle θ from the rotational sensor 21.

Figure 6:
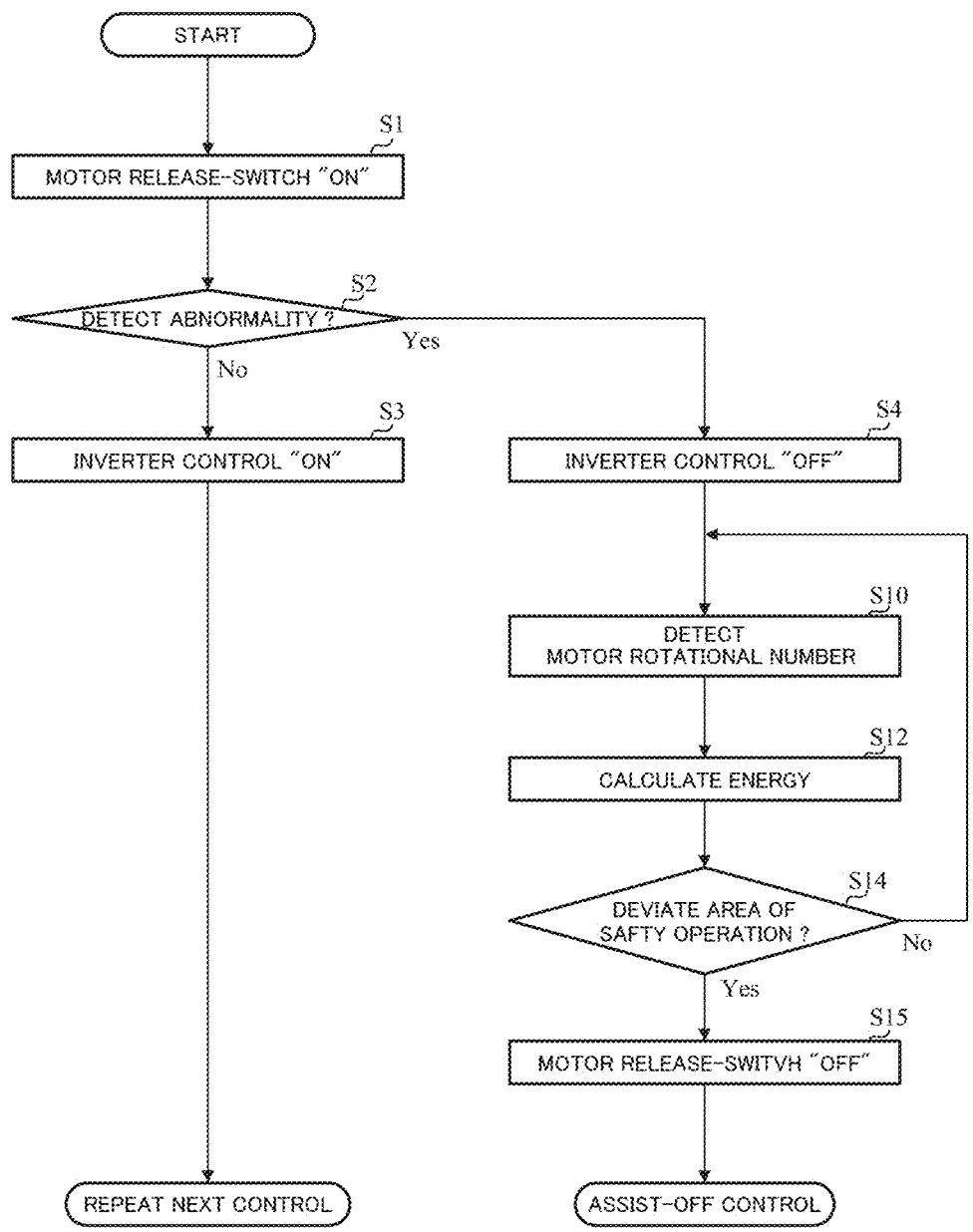
FIG. 6 is a flow chart showing an operation example (the first embodiment) of the present invention.

In such a constitution, an operation example of the present invention (the first embodiment) will be described with reference to a flow chart of FIG. 6.

When the control operation is started, first the motor release-switch 140 (140U, 140V, 140W) is ON-switched by the motor release-switch control section 133 through the control section 120 (Step S1). The state detecting section 125 judges whether the abnormality is detected in the sensor abnormality detecting section 131 or the inverter abnormality detecting section 135 or not (Step S2), and ON-switches the control of the inverter 106 by the current control section 124 in the control section 120 when the abnormality is not detected (Step S3). Thereafter, a next control is repeated.

Further, in a case that the abnormality is detected at the above Step S2, it is judged that the continuation of the assist control is impossible, and the control of the inverter 106 is OFF-switched by the control section 120 (Step S4). The case that the control of the inverter 106 is OFF-switched is some system abnormality, for example, a disconnection of the torque sensor, a short-circuit fault of upper and lower arms of the inverter 106 and so on, and is a case that an assist-continuation-impossible or an assist control interruption is judged.

When the control of the inverter 106 is OFF-switched, the motor rotational number detecting section 132 detects a rotational number rpm of the motor 20 rotated by the external force (Step S10), the detected rotational number rpm is inputted into the control section. The energy calculating section 121 in the control section 120 calculates the energy W of the motor back-EMF E and the regenerative current with the data table 123 based on the detected rotational number rpm (Step S12). Moreover, the motor back-EMF E is obtained in accordance with the following Expression 1 and is in advance tabulated with an actual measurement as well as a measurement of the regenerative current.

$$E = k \times \text{motor rotational number per unit time} \quad \text{(Expression 1)}$$

where, "k" is a motor constant defined by a magnetic flux density, a rotor diameter and so on of the motor.

The calculated energy W is inputted into the judging section 122, the judging section 122 judges whether the energy W deviates the area of safety operation of the FETs comprising the motor release-switch or not (Step S14). A case that the energy W does not deviate the area of safety operation, that is, the motor rotational number rpm is high, is a dangerous region that the regenerative current destroys the FET. Further, the switching loss due to the regenerative current is equal to or more than the area of safety operation, and therefore the ON-operation of the motor release-switch 140 is continued. In this way, the return control of the regenerative current to the power source is performed and the braking force is given to the motor during rotation.

The motor rotational number gradually decreases due to the braking force, after the energy W enters in the area of safety operation according to the switching loss due to the regenerative current, the motor release-switch 140 is OFF-switched (Step S15). Consequently, the FETs comprising the motor release-switch 140 are not destroyed, and the necessary processing for the assist control stop is performed after the OFF-operation of the motor release-switch 140.

Moreover, the motor rotational number to OFF-switch the motor release-switch 140 greatly varies due to a kind of a motor and the FETs to use, a wire resistance and so on in comparison with a withstand voltage data, the area of safety operation. Therefore, the numerical values of the withstand voltage data, the area of safety operation and so on are led by using a real machine.

Next, the second embodiment considered a temperature of the semiconductor switching element or circumference temperature will be described.

Figure 7:
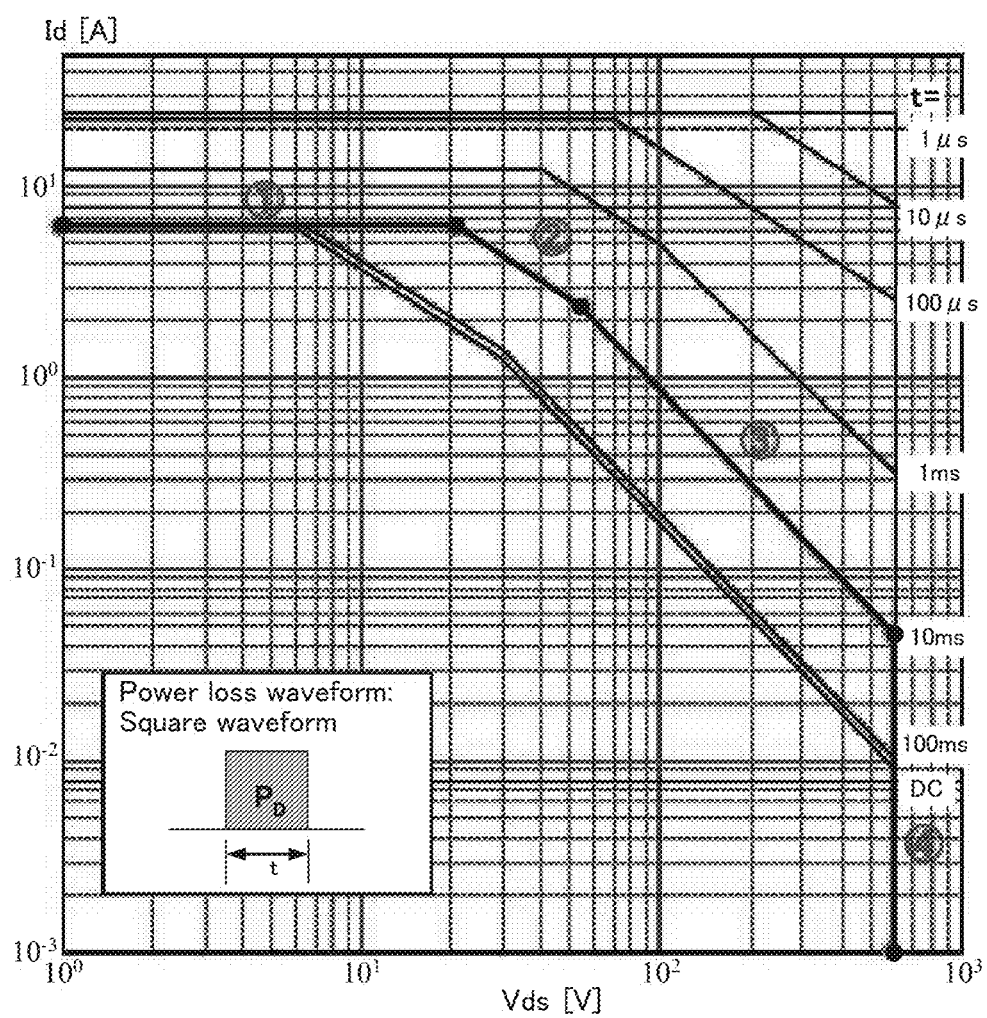
FIG. 7 is a characteristic diagram to show a characteristic example of a drain-source voltage Vds and a drain current Id of an FET.
Figure 8:
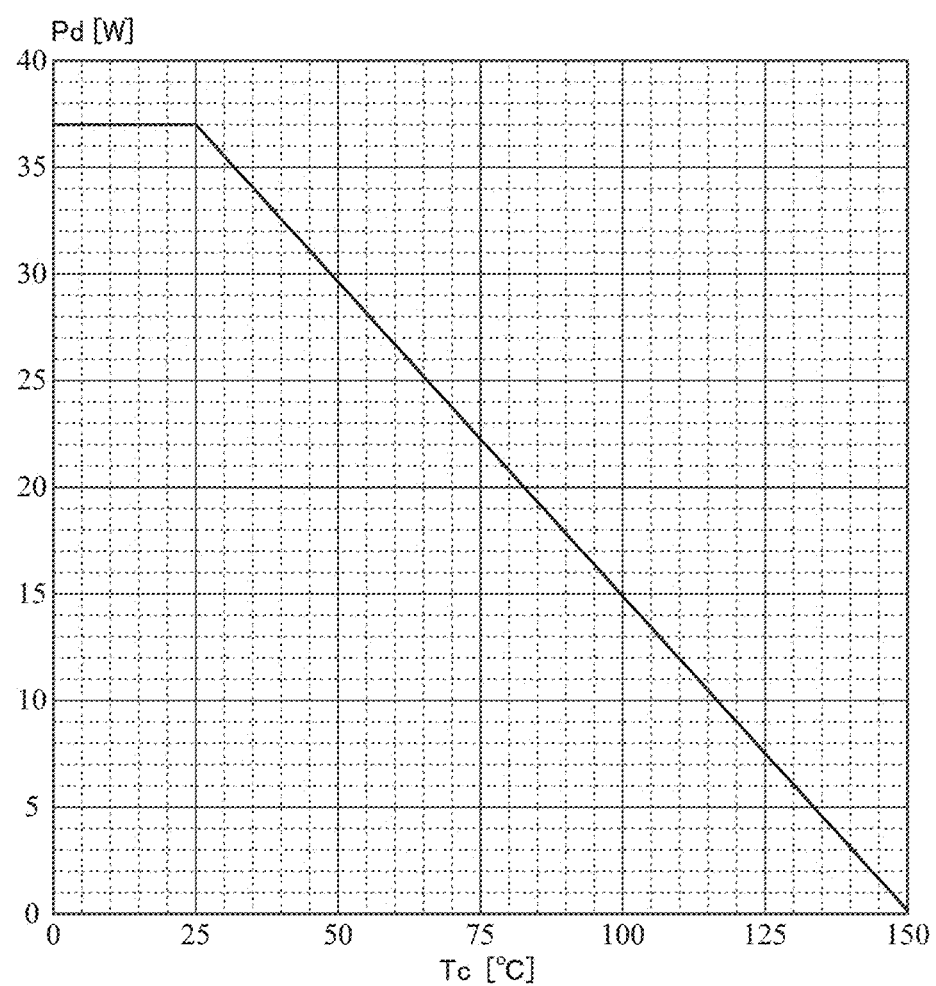
FIG. 8 is a characteristic diagram to show an example a temperature characteristic of an allowable loss Pd of an FET.

Generally, the area of safety operation (AOS) of operating FET is defined by a relation of a drain current Id and a drain-source voltage Vds as shown in FIG. 7 and a temperature characteristic of the maximum allowable loss Pd as shown in FIG. 8. However, the area of safety operation varies due to operating conditions (an FET-case temperature Tc, an operating frequency f, an ON-width and so on) actually used. Especially, since the maximum allowable loss Pd decreases when the case temperature increases, the temperature information is important in order to obtain an exact the area of safety operation. Since it is possible to estimate the case temperature Tc of the FET if capable of knowing a temperature due to a temperature detecting element on a power substrate, it is possible to calculate the maximum allowable loss Pd corresponding to the temperature.

Figure 9:
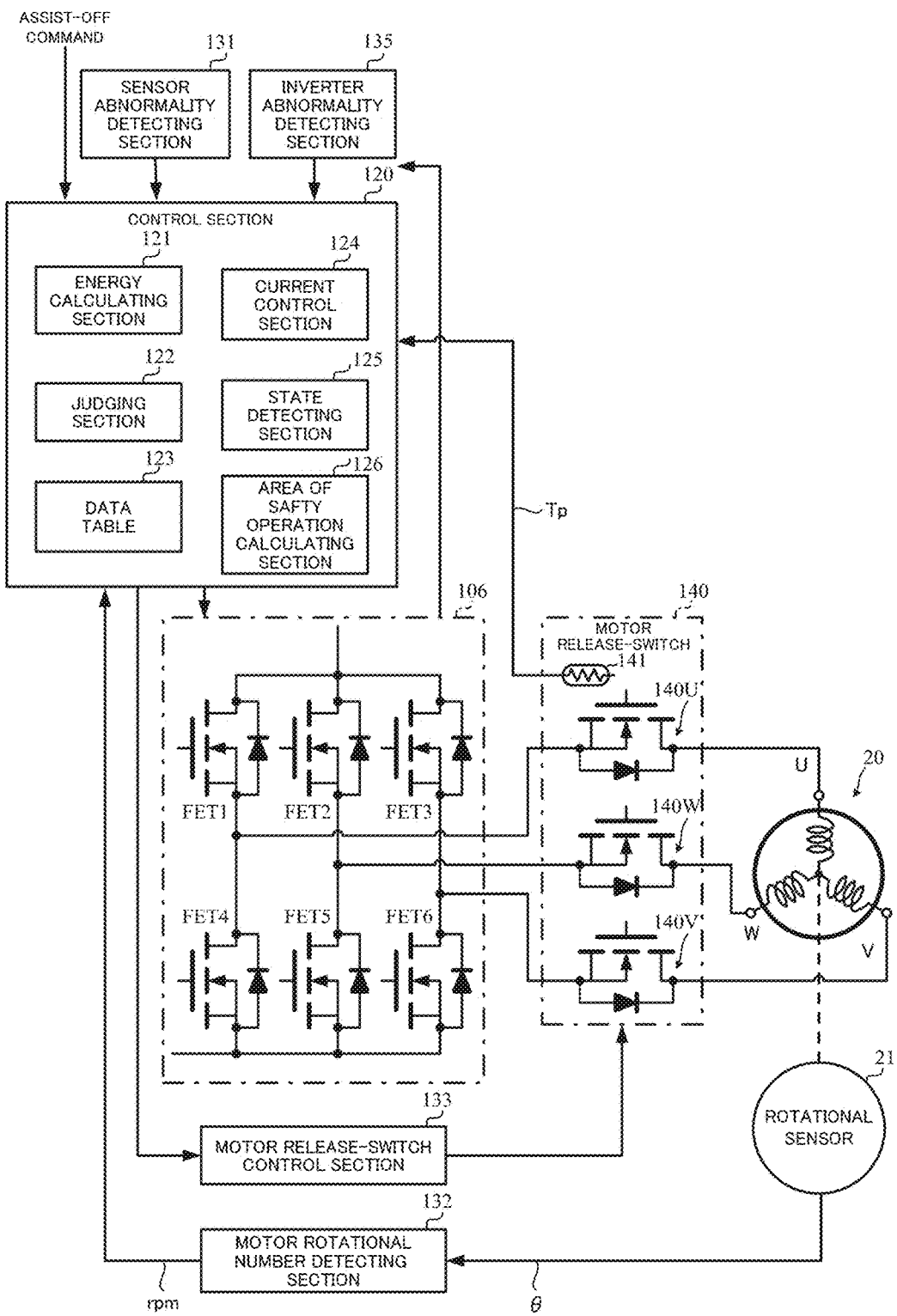
FIG. 9 is a block diagram showing a configuration example (the second embodiment) of the present invention.

In this connection, the present second embodiment judges not only the motor rotational number (the regenerative current) but also the consideration of the temperature of the semiconductor switching element (FET) (on the power substrate) or the circumference temperature information, and judges the exact area of safety operation. The second embodiment is capable of OFF-switching the semiconductor switching element (FET) more safety than the judgment due to the rotational number of the motor-unit In the second embodiment, as shown in FIG. 9 corresponding to FIG. 4, there is provided a thermistor 141 as a temperature sensor of the temperature detecting section in order to detect the temperature of the motor release-switch 140 (140U, 140V, 140W) or the circumference temperature, and the electrically detected temperature information Tp is inputted into the control section 120. The arrangement of the thermistor 141 may be on the power substrate mounted the motor release-switch 140 (140U, 140V, 140W). An area of safety operation calculating section 126 provided in the control section 120 calculates the area of safety operation based on the temperature information Tp. The calculated area of safety operation is inputted into the judging section 122.

Figure 10:
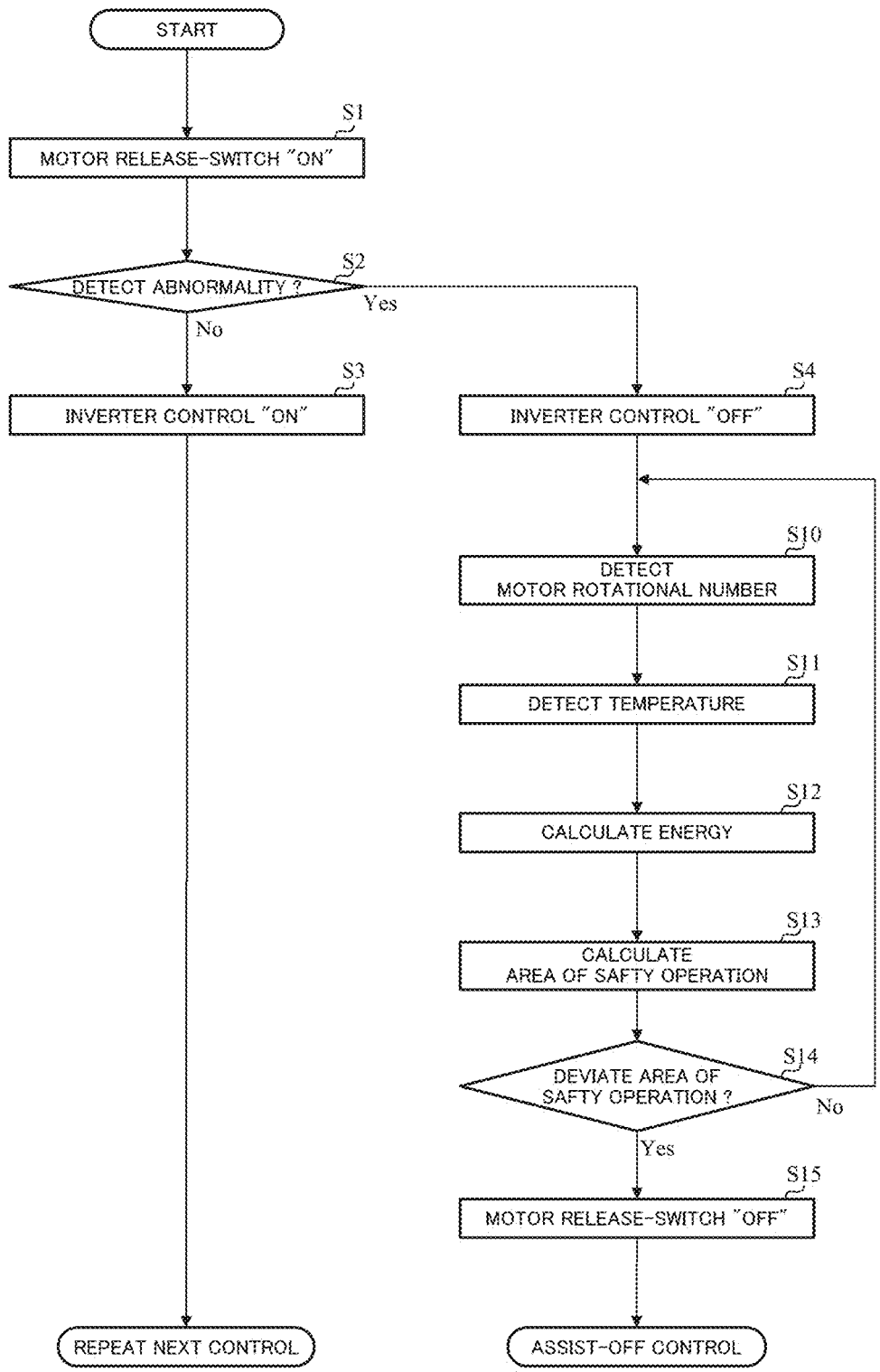
FIG. 10 is a flow chart showing an operation example (the second embodiment) of the present invention.

In such a constitution, an operation example is shown in a flow chart of FIG. 10. in the second embodiment, when the control of the inverter 106 is OFF-switched (Step S10), the motor rotational number detecting section 132 detects the motor rotational number rpm of the motor 20 (Step S11), the temperature (or the circumference temperature) Tp of the motor release-switch 140 is detected by the thermistor 141, and their data are inputted into the control section 120. The energy calculating section 121 in the control section 120 calculates the energy W of the motor back-EMF E and the regenerative current with the data table 123 based on the motor rotational number rpm (Step S12), the area of safety operation calculating section 126 calculates the area of safety operation of the motor release-switch 140 based on the temperature Tp (Step S13).

Moreover, the motor back-EMF E is obtained in accordance with the above Expression 1, the data is advance tabulated by an actual measurement similar to the first embodiment. The calculation order of the detection of the motor rotational number rpm, the detection of the temperature Tp, the calculation of the energy W and the calculation of the area of safety operation is suitably changeable.

The calculated area of safety operation is inputted into the judging section 122, the judging section 122 judges the calculated energy W deviates the area of safety operation of the FET or not (Step S14). If the calculated energy W does not deviate the area of safety operation (the motor rotational number rpm is high), it is a dangerous area that the regenerative power destroys the FET and the switching loss due to the regenerative current is equal to or more than the area of safety operation. Therefore, the ON-operation of the motor release-switch 140 continues. In this way, the return control of the regenerative current is performed and the braking force is given to the motor during rotation.

The motor rotational number rpm gradually decreases by the braking force, after the energy W enters in the area of safety operation according to the switching loss due to the regenerative current, the motor release-switch 140 is OFF-switched (Step S15). Thus, the FET comprising the motor release-switch 140 is not destroyed, and the necessary processing for the assist control stop is performed after the OFF-operation of the motor release-switch 140.

Figure 11:
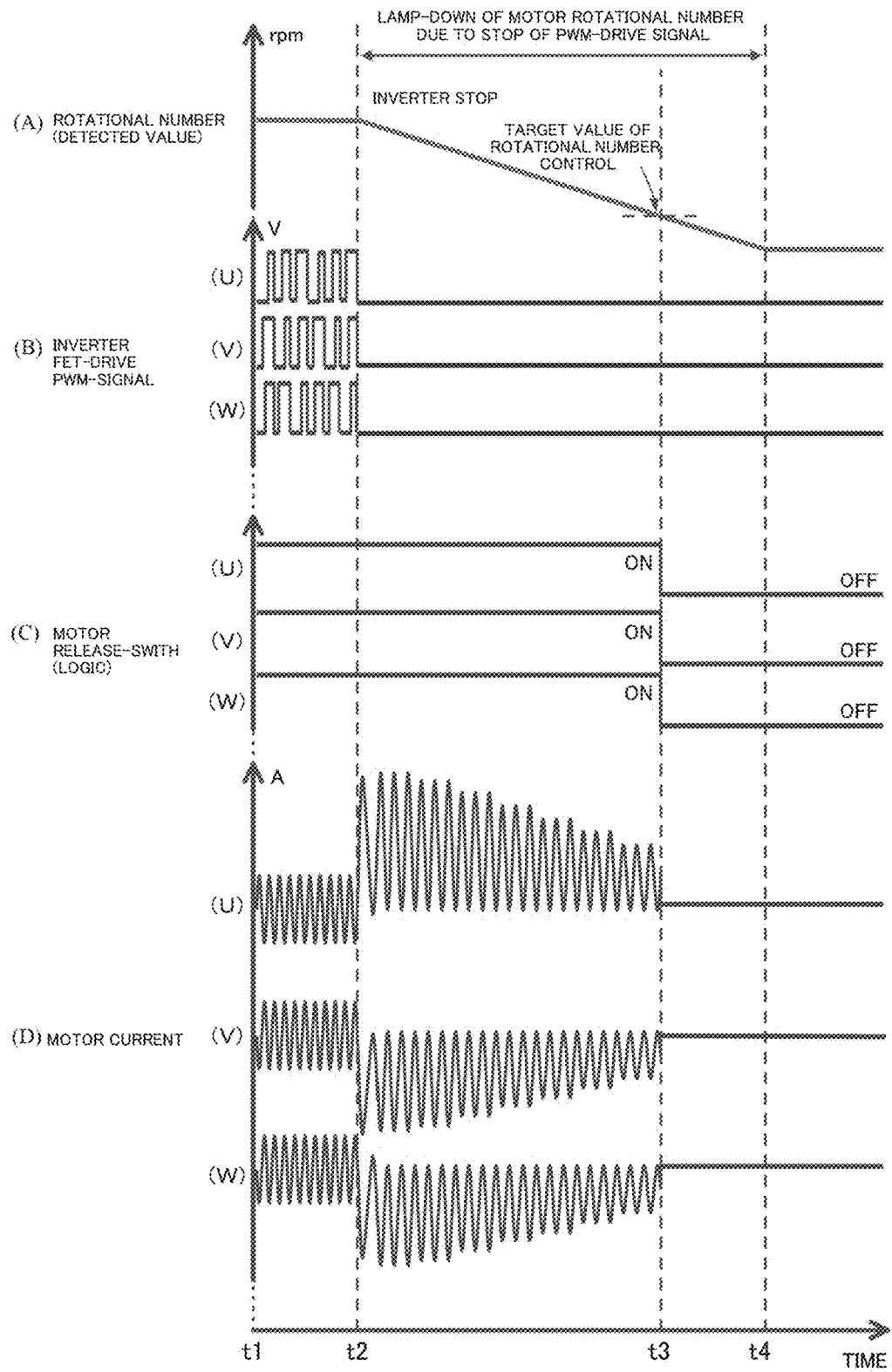
FIG. 11 is a time chart showing an operation example of the present invention.

FIG. 11 shows a relation of (A) motor rotational number (rpm), (B) FET-drive PWM-signal (3-phases) of the inverter 106 (unit V), (C) ON/OFF-state (3-phases) of the motor release-switch 140 (logic), (D) motor current (3-phases) (unit A), and shows an example when the U-phase upper FET-arm becomes to a failure or an abnormality.

That is, during from a time point t1 to a time point t2, the FET-drive PWM-signal is supplied as shown in FIG. 11 (B), the motor release-switch 140 is ON-switched as shown in FIG. 11 (C) and the motor driving is usually performed as shown in FIG. 11 (D). Then, when the state detecting section 125 detects the abnormality at the time point t2, the supply of the FET-drive PWM-signal is stopped (stop of the inverter 106) as shown in FIG. 11 (B), the motor rotational number rpm lamps down after the time pint t2 as shown in FIG. 11 (A). At this time (t2-t4), since the motor 20 rotates and the generative current follows into the power source, the motor current varies as shown in FIG. 11 (D). Then, when the motor rotational number rpm reaches at a control target value (e.g. 800 rpm) (a time point t3), the motor release-switch 140 is OFF-switched by the motor release-switch control section 133 (FIG. 11 (C)). Consequently, the motor current becomes to FIG. 11 (D). The motor rotational number rpm also becomes "0" at the time point t4 thereafter (FIG. 11 (A)).

Moreover, in the above-described first and second embodiments, although the motor rotational number is detected based on the rotational sensor (the resolver), it is possible to estimate the motor rotational number by the motor terminal voltage or the current detection by using the shunt resistance.

Further, in the above-described second embodiment, although the thermistor is explained as the temperature sensor, it is possible to use a resistance thermometer, a thermocouple, an IC-temperature sensor utilized a temperature characteristic of a transistor, a crystal thermometer utilized a Y-cut of a crystal and so on.

EXPLANATION OF REFERENCE NUMERALS 1 handle
2 column shaft (steering shaft, handle shaft)
10 torque sensor
12 vehicle speed sensor
14 steering angle sensor
20 motor
21 rotational sensor
100 control unit (ECU)
101 current command value calculating section
104 PI-control section
105 PWM-control section
106 inverter
110 compensation signal generating section
120 control section
121 energy calculating section
122 judging section
123 data table
125 state detecting section
131 sensor abnormality detecting section
132 motor velocity detecting section
133 motor release-switch control section
140 motor release-switch
141 thermistor

The invention claimed is:
1. A motor control apparatus that drive-controls a motor by an inverter based on a current command value calculated with a steering torque from a torque sensor, and a motor release-switch comprising field-effect transistors (FETs) is connected between said inverter and said motor, comprising:
a control section to detect an assist state on sensor kinds including said torque sensor and an assist state of said inverter, to ON/OFF-switch a control of said inverter based on a detection result and to detect a presence of an abnormality;
a motor rotational number detecting section to detect a rotational number of said motor;

an energy calculating section to calculate an energy of a motor back-EMF and a regenerative current based on said rotational number; and a judging section to compare said energy with an area of safety operation of said FETs and to OFF-switch all of said FETs when said energy becomes within said area of safety operation;

wherein said control of said inverter is ON-switched when said control section does not detect an abnormality, and said control of said inverter is OFF-switched when said control section detects said abnormality.

2. The motor control apparatus according to claim 1 further comprising a temperature detecting section to detect a temperature of said FETs or a circumference temperature of said FETs, wherein said control section further includes an area of safety operation calculating section to calculate said area of safety operation based on a detected temperature detected by said temperature detecting section.

3. The motor control apparatus according to claim 2 further comprising an abnormality detecting section and a state detecting section to detect a presence of an abnormality based on an information from said abnormality detecting section, wherein said control section ON-switches said control of said inverter when said state detecting section does not detect said abnormality and OFF-switches said control of said inverter when said state detecting section detects said abnormality.

4. An electric power steering apparatus provided with the motor control apparatus according to claim 1.

5. An electric power steering apparatus provided with the motor control apparatus according to claim 2.

6. An electric power steering apparatus provided with the motor control apparatus according to claim 3.

* * * * *